United States Patent [19]

Nottke

[11] 3,933,767

[45] Jan. 20, 1976

[54] CYANOPERFLUOROETHER ACID FLUORIDES AND COPOLYMERS DERIVED THEREFROM

[75] Inventor: James E. Nottke, Greenville, N.C.

[73] Assignee: E. I. Du Pont de Nemours and Company, Wilmington, Del.

[22] Filed: May 22, 1974

[21] Appl. No.: 472,420

Related U.S. Application Data

[62] Division of Ser. No. 262,590, June 14, 1972, Pat. No. 3,852,326.

[52] U.S. Cl.... 260/80.76; 260/80.77; 260/85.5 XA; 260/87.5 A
[51] Int. Cl.² ............. C08F 214/18; C08F 214/20; C08F 214/22; C08F 214/26
[58] Field of Search.... 260/80.77, 87.5 A, 85.5 XA, 260/80.76, 85.5 R

[56] References Cited

UNITED STATES PATENTS

| | | | |
|---|---|---|---|
| 3,546,186 | 12/1970 | Gladding et al. | 260/87.7 |
| 3,641,104 | 2/1972 | Anderson et al. | 260/87.5 A |

*Primary Examiner*—Joseph L. Schofer
*Assistant Examiner*—Maria S. Tungol

[57] ABSTRACT

Disclosed herein are cyanoperfluoro(vinyl ethers), intermediate acid fluorides; a process for preparing the acid fluorides, and a process for preparing the vinyl ethers from acid fluoride and an alkali-metal carbonate. Also disclosed are copolymers incorporating units derived from the vinyl ethers as crosslinking constituents therein.

3 Claims, No Drawings

CYANOPERFLUOROETHER ACID FLUORIDES AND COPOLYMERS DERIVED THEREFROM

CROSS-REFERENCE TO RELATED APPLICATION

This is a division of copending application Ser. No. 262,590, filed June 14, 1972, now U.S. Pat. No. 3,852,326.

BACKGROUND OF THE INVENTION

1. Field of the Invention

This invention relates to cyano- and fluorine-containing compounds, to a process therefor, and to copolymers containing units derived from cyanoperfluoro(vinyl ethers).

2. Description of the Prior Art

U.S. Pat. No. 3,546,186 describes copolymers of certain cyanoperfluoro(vinyl ethers) of the formula $NC-(CF_2)_n-O-CF=CF_2$, where $n$ is 2 to 12.

SUMMARY OF THE INVENTION

The novel process of this invention comprises reacting

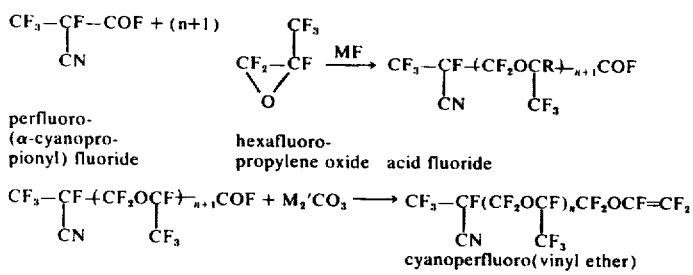

perfluoro-
($\alpha$-cyanopro-
pionyl) fluoride hexafluoro-
propylene oxide   acid fluoride $$CF_3-CF-(CF_2OCF)_{n+1}COF + M_2'CO_3 \longrightarrow CF_3-CF(CF_2OCF)_nCF_2OCF=CF_2$$
$$\quad\quad |\quad\quad\quad |\quad\quad\quad\quad\quad\quad\quad\quad\quad\quad\quad\quad\quad |\quad\quad\quad |$$
$$\quad\quad CN\quad\quad CF_3\quad\quad\quad\quad\quad\quad\quad\quad\quad\quad\quad\quad CN\quad\quad CF_3$$

cyanoperfluoro(vinyl ether)

In the process as outlined, M is an alkali metal, silver, copper (I), mercury(I) or tetra(lower alkyl) ammonium; M' is an alkali metal; and $n$ is an integer from 0 to 4. The preferred vinyl ethers are those in which $n$ is from 0 to 2.

Presented in the Table are the novel products of this invention.

a. vinylidene fluoride and hexafluoropropylene, b. tetrafluoroethylene and $CF_2=CF-O-R_f$ wherein $R_f$ is perfluoroalkyl of from 1–3 carbons. The most preferred copolymers are those in which the novel polymeric components described herein have values for $n$ of 0 to 2.

Preferably, the polymers of the invention contain units derived from the cyanoperfluoro(vinyl ether) in the amount of about 0.5 to 10 mole percent. In terpolymers, the other comonomers are from 99.5 to 95 mole percent of the terpolymer, and are preferably present in roughly equal proportions, ranging relative to one another from 30/70 to 70/30, preferably about 50/50 mole percent.

DETAILS OF THE INVENTION

The perfluoro($\alpha$-cyanopropionyl)fluoride reactant is made in accordance with the disclosure in the coassigned application entitled "Perfluoro($\alpha$-Cyanopropionyl) Fluoride And Its Preparation," filed June 14, 1972, in the name of David C. England, Ser. No. 262,591.

In summary, the perfluoro($\alpha$-cyanopropionyl) fluoride is made from carbonyl fluoride and perfluoroacrylonitrile at a ratio of at least one mole of carbonyl fluoride per mole of perfluoroacrylonitrile. The reaction is carried out in the presence of an alkali-metal-fluoride, silver-fluoride or copper(I)-fluoride catalyst. The reaction is conducted in an inert, aprotic solvent at a temperature from about −40°C. to 200°C.

TABLE

| Acid Fluorides | Vinyl Ethers | Copolymers |
|---|---|---|
| perfluoro(5-cyano-2-methyl-3-oxahexanoyl)fluoride) [where n=0] | perfluoro(5-cyano-3-oxa-1-hexene) [where n=0] | normally solid random copolymers of at least one vinyl ether copolymerized with at least one member of the group vinylidene fluoride, tetrafluoroethylene, chlorotrifluoroethylene, hexafluoropropylene, 1,1,1,2,3-pentafluoropropylene, and $CF_2=CF-O-R_f$, where $R_f$ is perfluoroalkyl of 1 to 3 carbons. |
| perfluoro(8-cyano-2,5-dimethyl-3,6-dioxanonanoyl) fluoride [where n=1] | perfluoro(8-cyano-5-methyl-3,6-dioxa-1-nonene) [where n=1] | |
| perfluoro(11-cyano-2,5,8-trimethyl-3,6,9-trioxadodecanoyl) fluoride [where n=2] | perfluoro(11-cyano-5,8-dimethyl-3,6,9-trioxa-1-dodecene) [where n=2] | |
| perfluoro(14-cyano-2,5,8,11-tetramethyl-3,6,9,12-tetraoxapentadecanoyl) fluoride [where n=3] | perfluoro(14-cyano-5,8,11-trimethyl-3,6,9,12-tetraoxa-1-pentadecene) [where n=3] | |
| perfluoro(17-cyano-2,5,8,11,14-pentamethyl-3,6,9,12,15-pentaoxaoctadecanoyl) fluoride [where n=4] | perfluoro(17-cyano-5,8,11,14-tetramethyl-3,6,9,12,15-pentaoxa-1-octadecene) [where n=4] | |

"Copolymer" is used herein in its usual generic sense to mean a polymer containing units derived from at least two monomers. Thus, the polymeric products of the invention can contain units derived from two, three or more monomers. Preferred classes of copolymers include terpolymers of the novel vinyl ethers with

Making the Acid Fluorides

It should be understood that a product of this step in which $n + 1$ is relatively low can be reacted with hexafluoropropylene oxide under the conditions described below to give a product of the same formula but with a higher value of $n + 1$. Likewise, a mixture of compounds having different values of n + 1 can be reacted with hexafluoropropylene oxide under the same conditions to give a product (usually a mixture) having a higher value or values of n + 1.

Reactant ratios will usually be about that dictated by the stoichiometry of the desired reaction. Even when exact whole-number reactant ratios are used, a mixture of compounds having different values of n usually results. However, the desired product, which will always predominate, can be separated by distillation. The separation is easier for relatively lower values of n.

Examples of some operable tetra(lower alkyl) ammonium fluoride catalysts are tetramethylammonium fluoride, tetraethylammonium fluoride, tetraisopentylammonium fluoride, tetrahexylammonium fluoride, diethyldipropylammonium fluoride, and heptylhexylmethylpropylammonium fluoride. Lower alkyl is defined as alkyl of up to seven carbons. The preferred catalysts are the alkali-metal fluorides, particularly cesium fluoride because of the good conversions that it gives.

The amount of catalyst can vary widely and can be from about 0.001 to more than 1.0 equivalent per mole of acid fluoride. About 0.01 equivalent to 0.1 equivalent is preferred.

Suitable solvents are the "glymes," $CH_3(OCH_2CH_2)_mOCH_3$, where $m$ is an integer of at least 1. The compound in which $m$ is 1 is called glyme; in diglyme, $m = 2$, in triglyme, $m = 3$, in tetraglyme, $m = 4$, and so on. The amount of solvent can vary widely, but generally at least enough is used so that all the catalyst is dissolved in the solvent/acid fluoride mixture. In practice, from about 2 to 10 moles of solvent per equivalent of catalyst are used.

The operable temperature range is from about −30°C. to 30°C. The temperature for a given run will depend considerably on the amount of catalyst, particularly when the preferred catalyst, cesium fluoride, is used. With equivalent amounts of cesium fluoride, the reaction proceeds readily at about −30°C. to 20°C. With the preferred amounts of cesium fluoride, the preferred temperature range is about 10° to 20°C.

The reaction is conveniently run in an open system with suitable condensing means for returning low-boiling materials to the mixture. Closed systems at autogenous pressures can be used but are less convenient. The higher pressures then involved require especially rapid mixing and efficient cooling. Reaction conditions are usually maintained for a period of from a few minutes to an hour after all the hexafluoropropylene oxide is added to insure complete reaction.

Making the Vinyl Ethers

The acid fluoride product is mixed with a preheated stream of an inert gas such as nitrogen, helium, or carbon dioxide, and the resulting gaseous mixture is passed through a finely divided alkali-metal carbonate solid in a fluidized-bed reactor at between about 200°C. and 300°C. The best conversions to the desired products are obtained between about 255°C. and 275°C., and this temperature range is therefore preferred.

In the fluidized-bed reactor, the solid is fluidized by the gas stream and reacts with the acid fluoride components simultaneously. Elements of carbonyl fluoride are eliminated to produce at least one novel cyanoperfluoro(vinyl ether). The fluidized-bed technique for bringing about reactions of solids with gases is well known to those skilled in the art. See, for example, Fluidization Engineering by D. Kunii and O. Levenspiel (Wiley, 1969).

An amount of alkali-metal carbonate at least equivalent to the acid fluoride is used, and the rate of addition of the acid fluoride is such that all of it reacts before reaching the end of the fluidized bed. To help determine the rate of addition, the composition of the effluent gas can be monitored by gas chromatography or infrared analysis.

Copolymeric Products

The novel polymeric products heretofore described can be prepared by any of a number of known processes for making fluorine-containing copolymers. A preferred method, described in more detail in coassigned U.S. Pat. No. 3,546,186, employs aqueous media and free-radical initiators at slightly elevated temperatures, say, 40°C., and pressures in the order of 120 p.s.i.g. Alternatively, bulk or solution processes can be used with appropriate free-radical catalysts. Those skilled in the art will be able to determine any modifications of polymerization conditions necessary to suit the particular monomers employed, without difficulty.

DESCRIPTION OF THE PREFERRED EMBODIMENTS

The following Examples, illustrating the products and process of this invention, are given without any intention that the invention be limited thereto.

EXAMPLE 1

Perfluoro(5-cyano-2-methyl-3-oxahexanoyl) Fluoride [major fraction]

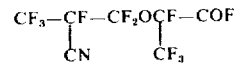

To a flask containing 8.0 g of cesium fluoride and 30 ml of dry tetraglyme was added 158 g of perfluoro(α-cyanopropionyl) fluoride. A dry nitrogen atmosphere and stirring were maintained throughout the reaction. With the reaction temperature maintained at 12°–20°C., 149 g of hexafluoropropylene oxide (HFPO) was added at such a rate that a gentle reflux was maintained from a dry-ice condenser over the reaction. The mixture was stirred for 30 minutes at 25°C. after the HFPO addition was complete. The volatiles were distilled under vacuum into a dry-ice-cooled flask, leaving the cesium fluoride and tetraglyme in the reaction flask. The collected volatiles were redistilled to give 262.5 g (86%) of perfluoro(5-cyano-2-methyl-3-oxahexanoyl) fluoride, B.R. 73°–79°C. and 8.5 g (2.2%) of a 1:1 mixture of this product and perfluoro(8-cyano-2,5-dimethyl-3,6-dioxanonanoyl) fluoride, B.R. 81°–124°C. The following analytical determinations were made on other samples prepared by essentially the foregoing method.

Anal. Calc'd. for $C_7F_{11}NO_2$: C, 24.79; F, 61.63; N, 4.13 Found: C, 25.25; F, 63.82; N, 4.52; 25.03; 63.91; 24.81 Spectral data:

IR (gas): 2295, 1895, 1305, 1250, 1170, 1140 1115, and 980 $cm^{-1}$.

FMR (neat): +26.3 (4 doublets, J = 5.5, 5.3Hz, 1F), −73.3 (multiplet, 1F), −75.0 (2 doublets, J = 9.5, 5.5Hz, 3F), −79.5 (multiplet, 1F), −81.9 (4 doublets, J = 5.5, 3.0, 1.2 Hz, 3F), −130 (multiplet, 1F), −139 ppm

EXAMPLE 2

Perfluoro(8-cyano-2,5-dimethyl-3,6-dioxanonanoyl) Fluoride [major fraction]

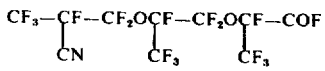

The procedure was essentially that of Example 1, with some variation in times because of the different amounts of reactants and slight variations in temperature. From 2.5 g of cesium fluoride, 20 ml of tetraglyme, 46 g of perfluoro($\alpha$-cyanopropionyl) fluoride, and 90 g of hexafluoropropylene oxide, the following fractions were obtained in the redistillation step, and their compositions were determined by gas chromatography.

| B.R., °C. | Gms. | $CF_3-CF(CN)+CF_2OCF(CF_3)+_{n+1}COF$ |
|---|---|---|
| 61–63 | 9.5 | 60% "HFPO dimer"; 40% n = ) |
| 63–70 | 10.4 | 75% n = 0, 25% n = 1 |
| 110–120 | 91.3 | 100% n = 1 |
| 120/760–400mm | 12.5 | 42% n = 1, 58% n = 2 |

The products and their yields were therefore as follows: Perfluoro(5-cyano-2-methyl-3-oxahexanoyl) fluoride ($n$ = 0), 13%; perfluoro(8-cyano-2,5-dimethyl-3,6-dioxanonanoyl) fluoride ($n$ = 1), 75%; and perfluoro(11-cyano-2,5,8-trimethyl-3,6,9-trioxadodecanoyl) fluoride ($n$ = 2), 4%.

The infrared absorption spectrum of the major product ($n$ = 1) was essentially superimposable on that of the major product of Example 1, with some differences in intensities and insignificant differences in frequencies.

The fluorine magnetic resonance of the major product was determined on a separate sample.

FMR (neat): +26.4 (multiplet, 1F), −75.0 (multiplet, 5F), −79.8 (multiplet, 3F), −82.4 (multiplet, 3F), −84.0 (multiplet, 2F), −131 (multiplet, 1F), −145 (multiplet, 1F), −175 ppm (multiplet, 1F).

EXAMPLE 3

Perfluoro-11-cyano-2,5,8-trimethyl-3,6,9-trioxadodecanoyl Fluoride [major fraction]

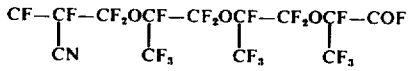

By essentially the procedure of Examples 1 and 2, 7 g of cesium fluoride, 30 ml of tetraglyme, 11.5 g of perfluoro($\alpha$-cyanopropionyl) fluoride, 68.5 g of perfluoro-(5-cyano-2-methyl-3-oxahexanoyl) fluoride, and 256 g of hexafluoropropylene oxide were reacted to give, in addition to the products of Examples 1 and 2, 24.1 g of perfluoro-11-cyano-2,5,8-trimethyl-3,6,9-trioxadodecanoyl fluoride, B.P. 106°C/100 mm. Spectral data:

IR (neat): 2295, 1890, 1310, 1250, 1170, 1140 1120, and 980 cm$^{-1}$

FMR (neat): +26.2 (multiplet, 1F), −75.3 (multiplet, 5F), −79.8 (multiplet, 9F), −83.9 (multiplet, 4F), −130.0 (multiplet, 1F), −144.1 (multiplet, 2F), −174.3 ppm (sextet, J = 9.9 Hz, 1F)

EXAMPLE 4

Perfluoro(8-cyano-5-methyl-3,6-dioxa-1-nonene) [major fraction]

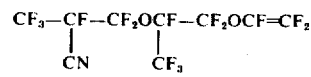

A bed (8 × 90 cm) of finely divided dry sodium carbonate held at 250°–270°C. in a vertical glass tube was fluidized with a minimum flow of preheated (300°C.) nitrogen from the bottom, and the exit gases passed out the top and through a series of three dry-ice cooled traps. Perfluoro(8-cyano-2,5-dimethyl-3,6-dioxanonanoyl) fluoride (215 g) was added at 0.59 ml/minute to the preheated nitrogen entering the bed. After all of the acid fluoride had been added, the traps were washed out with the aid of ethyl ether and the combined trap contents distilled to give 172 g (95%) of perfluoro(8-cyano-5-methyl-3,6-dioxa-1-nonene).

The following analytical data were obtained from separate sample prepared essentially as just described:
B.P. 120°–121°C., and Anal. Calc'd for $C_9F_{15}NO_2$: C, 24.62; F, 64.90; N, 3.19 Found: C, 24.56; F, 64.94; N, 3.06; 24.68 Spectral data:

IR (neat): 2290, 1840, 1450–1100, 1060, 980, 810, 740, 700 cm$^{-1}$

FMR (neat); −75.5 (multiplet, 5F), −80 (multiplet, 3F), −84.5 (multiplet, 2F), −115 (2 doublets, J = 86, 66.5 Hz, F$_a$), −122 (2 doublets J = 111, 86 Hz, F$_b$), −136.5 (4 triplets, J = 111, 66.5 6.2 Hz, F$_c$), −144 (multiplet, 1F), −174.5 ppm (sextet, J = 9.8 Hz, 1F)

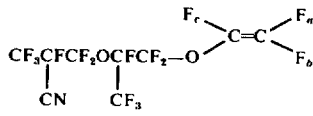

UTILITY

The products of this invention are useful for making crosslinked elastomers. Representative uses for such elastomers are as gaskets, chemical and thermal resistant lining for containers and coating or jacketing for hoses, cables and pipes.

As already stated, units derived from more than one of the novel vinyl ethers can be present in the copolymers of the invention. When two or more vinyl ethers are used as comonomers, they can be added to the copolymerization recipe as predetermined amounts of pure compounds or as an incompletely separated mixture of cyano(perfluoro vinyl ethers). A typical mixture of vinyl ethers is one such as is obtained by reacting the mixture of acid fluorides produced in Example 3 with an alkali-metal carbonate by the method of Example 4.

EXAMPLE 5

Terpolymer of tetrafluoroethylene, perfluoro(methyl vinyl ether), and perfluoro(8-cyano-5-methyl-3,6-dioxa-1-nonene)

A 400-ml stainless-steel shaker tube was charged with 100 ml of distilled water under nitrogen. The water was frozen by chilling the tube with solid carbon dioxide, and there were added to the tube under nitrogen 1.0 g of ammonium perfluorooctanoate, 0.80 g of ammonium persulfate, 0.20 g of sodium sulfite, 2.5 g of disodium monohydrogen phosphate heptahydrate, and 3.0 g of perfluoro(8-cyano-5-methyl-3,6-dioxa-1-nonene). The tube was closed and evacuated while still cold, and there were added 36.0 g of perfluoro(methyl vinyl ether) and 17.0 g of tetrafluoroethylene. The tube and contents were heated at 50°C. for 8 hours with shaking. The tube was cooled, volatile materials were allowed to evaporate, and the liquid latex was removed. It weighed 135 g.

The solid terpolymer was isolated by adding an equal volume of aqueous 3% magnesium chloride, filtering the solid that precipitated, washing it in a blender with 50% aqueous alcohol, washing with water, and drying. The infrared absorption spectrum indicated that the tetrafluoroethylene/perfluoro(methyl vinyl ether)/perfluoro(8-cyano-5-methyl-3,6-dioxa-1-nonene) terpolymer contained 33.4 mole % units derived from perfluoro(methyl vinyl ether) and an estimated 0.7 mole % of units derived from the perfluoro(8-cyano-5-methyl-3,6-dioxa-1-nonene).

Crosslinking

The terpolymer was combined with three corresponding products made in the same manner, and 95 grams of the mixed terpolymers was mixed with 5.7 g of tetraphenyltin on a two-roll rubber mill. Samples were molded under pressure at 177°C. for different times and then heated in an oven for 24 hours at 204°C. in air. Tensile testing by the method of ASTM D-412-66 gave the following results, which indicate that the product was crosslinked:

| Press Cure Time (hrs.) | 0.5 | 1 | 2 | 17 |
|---|---|---|---|---|
| Stress at 100% elong., $M_{100}$ (psi) | 520 | 490 | 480 | 460 |
| Stress at 200% elong., $M_{200}$ (psi) | 1370 | 1440 | 1275 | 1350 |
| Stress at break, $T_B$ (psi) | 2325 | 1900 | 2460 | 2380 |
| Elongation at break, $E_B$ (%) | 240 | 230 | 260 | 250 |
| Tensile set, T.S. (%) | 13 | 12 | 14 | 13 |

The crosslinked terpolymer was found to be insoluble in fluorocarbon solvents. Uncured (uncrosslinked) terpolymer would dissolve in such fluorocarbon solvents.

Although the invention has been described and exemplified by way of specific embodiments, it is not intended that it be limited thereto. As will be apparent to those skilled in the art, numerous modifications and variations of these embodiments can be made without departing from the spirit of the invention or the scope of the following claims.

The embodiments of the invention in which an exclusive property or privilege is claimed are defined as follows:

1. A copolymer of at least one cyanoperfluoro(vinyl ether) of the formula

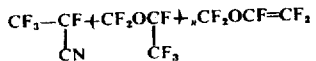

where $n$ is an integer from 0 to 4 and at least one member of the group
vinylidene fluoride, tetrafluoroethylene, chlorotrifluoroethylene, hexafluoropropylene, 1,1,1,2,3-pentafluoropropylene and $CF_2=CF-O-R_f$, where $R_f$ is perfluoroalkyl of one to three carbons.

2. A polymer according to claim 1, comprising a copolymer of vinylidene fluoride, hexafluoropropylene, and at least one cyanoperfluoro(vinyl ether).

3. A polymer according to claim 1, comprising a copolymer of tetrafluoroethylene, $CF_2=CF-O-R_f$, wherein $R_f$ is perfluoroalkyl of from one to three carbons, and at least one cyanoperfluoro(vinyl ether).

* * * * *